United States Patent
Jung et al.

(10) Patent No.: US 10,301,469 B2
(45) Date of Patent: May 28, 2019

(54) POLYAMIDE COMPOSITIONS COMPRISING A POLYAMIDE 6,6 AND A BLEND OF HIGH CHAIN-LENGTH POLYAMIDES, USE THEREOF, AND ARTICLES OBTAINED THEREFROM

(71) Applicant: RHODIA OPERATIONS, Aubervilliers (FR)

(72) Inventors: Jin-Kyung Jung, Seoul (KR); Elodie Seignobos, Saint Genis Laval (FR); Yeong-Chool Yu, Seoul (KR)

(73) Assignee: RHODIA OPERATIONS, Paris (FR)

( * ) Notice: Subject to any disclaimer, the term of this patent is extended or adjusted under 35 U.S.C. 154(b) by 0 days.

(21) Appl. No.: 15/534,171

(22) PCT Filed: Dec. 2, 2015

(86) PCT No.: PCT/EP2015/078281
§ 371 (c)(1),
(2) Date: Jun. 8, 2017

(87) PCT Pub. No.: WO2016/091668
PCT Pub. Date: Jun. 16, 2016

(65) Prior Publication Data
US 2017/0335106 A1 Nov. 23, 2017

(30) Foreign Application Priority Data
Dec. 12, 2014 (EP) .................................... 14197693

(51) Int. Cl.
| C08K 3/16 | (2006.01) |
| C08K 7/14 | (2006.01) |
| C08K 7/20 | (2006.01) |
| C08K 3/014 | (2018.01) |
| C08K 5/098 | (2006.01) |
| C08L 77/06 | (2006.01) |
| C10M 129/38 | (2006.01) |
| C10M 129/68 | (2006.01) |
| C10M 133/16 | (2006.01) |

(52) U.S. Cl.
CPC .............. C08L 77/06 (2013.01); C08K 3/16 (2013.01); C08K 5/098 (2013.01); C08K 7/14 (2013.01); C10M 129/38 (2013.01); C10M 129/68 (2013.01); C10M 133/16 (2013.01); C08K 3/014 (2018.01); C08K 7/20 (2013.01); C08L 2205/02 (2013.01); C08L 2205/03 (2013.01); C10M 2207/125 (2013.01); C10M 2207/126 (2013.01); C10M 2207/28 (2013.01); C10M 2215/08 (2013.01); C10N 2210/01 (2013.01); C10N 2210/02 (2013.01); C10N 2210/03 (2013.01)

(58) Field of Classification Search
CPC ...... C08L 77/06; C08L 2205/02; C08K 5/098
USPC .......................................................... 525/432
See application file for complete search history.

(56) References Cited

U.S. PATENT DOCUMENTS

| 7,202,298 B2 * | 4/2007 | Arakawa .................. C08K 7/14 524/494 |
| 2013/0023613 A1 * | 1/2013 | Klatt ....................... C08L 77/02 524/255 |
| 2014/0288220 A1 * | 9/2014 | Duncan .................... C08K 5/20 524/133 |
| 2014/0378604 A1 * | 12/2014 | Yu .......................... C08L 77/06 524/538 |
| 2015/0337108 A1 * | 11/2015 | Ieda ........................ C08K 3/22 524/606 |

FOREIGN PATENT DOCUMENTS

| JP | 61060754 A | * | 3/1986 | |
| WO | WO-2013041594 A1 | * | 3/2013 | .............. C08L 77/06 |

OTHER PUBLICATIONS

Viscosity Definitions (3 pages, 2018).*
Machine translated English language equivalent of JP 61-060754 (1986, 3 pages).*
Derwent Abstract of JP 61-060754 (Acc. No. 1986-121892, 1991, 2 pages).*

* cited by examiner

*Primary Examiner* — Brieann R Johnston
(74) *Attorney, Agent, or Firm* — Osha Liang LLP

(57) ABSTRACT

The present invention provides polyamide compositions comprising (a) at least one polyamide mixture; (b) at least one reinforcing filler; (c) at least one heat stabilizer; and (d) at least one ionic lubricant, wherein the (a) at least one polyamide mixture is formed from (i) a polyamide 6,6, the amount of AEG being greater than the amount of CEG, and (ii) a blend of a first high chain-length polyamide having viscosity number (VN) of $X_1$ and a second high chain-length polyamide having VN of $X_2$, $X_1$ being greater than $X_2$. The polyamide composition can be advantageously used to produce articles exhibiting enhanced chemical resistance, notably $CaCl_2$ salt crack resistance, such as radiator end tank in an automobile.

20 Claims, No Drawings

POLYAMIDE COMPOSITIONS COMPRISING A POLYAMIDE 6,6 AND A BLEND OF HIGH CHAIN-LENGTH POLYAMIDES, USE THEREOF, AND ARTICLES OBTAINED THEREFROM

CROSS-REFERENCE TO RELATED APPLICATIONS

The present application is a U.S. national phase entry under 35 U.S.C. § 371 of International Application No. PCT/EP2015/078281, filed Dec. 2, 2015, which claims priority to European application No. 14197693.6 filed on Dec. 12, 2014, the whole content of this application being incorporated herein by reference. Should the disclosure of any patents, patent applications, and publications which are incorporated herein by reference conflict with the description of the present application to the extent that it may render a term unclear, the present description shall take precedence.

TECHNICAL FIELD

The present invention relates to a polyamide composition comprising (a) at least one polyamide mixture, (b) at least one reinforcing filler, (c) at least one heat stabilizer, and (d) at least one ionic lubricant, and optionally (e) at least one additive, wherein the (a) at least one polyamide mixture is formed from (i) a polyamide 6,6 and (ii) a blend of high chain-length polyamides comprising a first high chain-length polyamide having viscosity number (VN) of $X_1$ and a second high chain-length polyamide having VN of $X_2$, wherein $X_1$ is greater than $X_2$. The polyamide composition of the present invention can be advantageously used to produce articles exhibiting enhanced chemical resistance, notably with respect to $CaCl_2$, $ZnCl_2$, and ethylene glycol, such as radiator end tank in an automobile.

BACKGROUND OF THE INVENTION

The following discussion of the prior art is provided to place the invention in an appropriate technical context and enable the advantages of it to be more fully understood. It should be appreciated, however, that any discussion of the prior art throughout the specification should not be considered as an express or implied admission that such prior art is widely known or forms part of common general knowledge in the field.

A polyamide is one of the polymers which are frequently used as engineering plastics for a very wide range of applications. A polyamide molding composition is of significant commercial interest and may be used to produce automobile or electrical components, generally by injection molding, in view of weight reduction, ease in assembling parts/components and also its design flexibility.

For particular applications, such as automobile engine components including radiator end tank, air intake manifold, water pump body, intercooler air duct, timing belt cover, electrical connector and engine cover, which are to be exposed to high temperature during their lifecycle, required is a polyamide molding composition which is capable of exhibiting excellent mechanical strength and thermal stability, i.e., high performance retention of mechanical properties such as tensile strength (TS) to break and Charpy impact strength after thermal aging, good spiral flow, and minimum distortion during injection molding as well as low moisture content and excellent salt crack resistance.

In general, a polyamide molding composition comprising reinforcing fillers exhibits excellent mechanical properties such as impact strength, flexural properties, and excellent toughness in addition to good heat resistance, and thus can be substituted for metal materials, which have been used as structural materials for automobiles. Normally, those structural materials are used in chemically aggressive environments, e.g., antifreeze at elevated temperatures and deicing agent commonly used on the roads during winter time.

Polyamide 6,6 is frequently used when high mechanical strength and good stability under heat is required, but polyamide 6,6 is also susceptible to hydrolysis, and exhibits relatively low resistance to chlorides, e.g., sodium chloride, calcium chloride, and zinc chloride, which are particularly useful to prevent ice formation and to deice the surface of roads by depressing the freezing point of water, and also exhibits low resistance to ethylene glycol and propylene glycol, which are commonly used as antifreeze in an engine cooling system.

Further, ionic lubricants, such as metal soaps, e.g., Al salts, Zn salts, alkali metal salts, alkaline earth metal salts, or esters or amides of fatty acids, in particular the soaps of alkaline earth metals are widely used to stabilize plastics, functioning as release agents in polyamides and polyesters, as stabilizers in PVC, and also as acid acceptors in polyolefins. Metal soaps are commonly incorporated into a polyamide composition as lubricant to prevent a polyamide molding composition from adhering to the surface of a mold, and also used as nucleating agents in polyamides. Some lubricants also contribute to reducing melt viscosity of a polyamide composition and thus increasing flowability thereof. In addition, the presence of ionic lubricants within a polyamide composition reinforced with fillers such as glass fibers is normally detrimental to the impact strength of the polyamide composition, since ionic lubricants tend to hinder the binding of glass fibers to polyamides.

It is hence required a polyamide 6,6 composition, which comprises at least one reinforcing filler and at least one ionic lubricant, exhibiting good resistance to chemicals and having melt viscosity appropriate for injection molding, while maintaining advantageous mechanical and thermal properties thereof. For instance, PCT publication No. WO 2013/041594 A1 (Rhodia Operations) discloses a blend of a polyamide 6,6, of which the amount of amine end group (AEG) is greater than the amount of carboxylic acid end group (CEG), with a polyamide 6,10, which may remedy the drawbacks of a polyamide 6,6 composition as above mentioned, but no mention is made regarding the presence of an ionic lubricant and its effect on the melt viscosity of a polyamide composition.

Therefore, a polyamide 6,6 composition, which comprises at least one reinforcing filler and at least one ionic lubricant, exhibiting flowability appropriate for injection molding in addition to other advantageous properties as above mentioned, is required in this technology field. The high chain-length polyamide, such as polyamide 6,10 is particularly advantageous in the present invention in view of its mechanical strength, gas barrier property, particularly against refrigerants, high temperature properties, and/or environmental friendliness.

DESCRIPTION OF THE INVENTION

The present invention relates to a polyamide composition comprising:
(a) at least one polyamide mixture formed from
 (i) a polyamide 6,6, of which the amount of AEG is greater than the amount of CEG; and (ii) a blend of high chain-length polyamides comprising a first high chain-length polyamide having VN of $X_1$ and a second high chain-length polyamide having VN of $X_2$;
(b) at least one reinforcing filler;
(c) at least one heat stabilizer; and
(d) at least one ionic lubricant,
wherein $X_1$ is greater than $X_2$, and VN is measured in accordance with the standard ISO 307 in a 0.005 g/mL strength solution of polyamide at 25° C.

The present invention also relates to a polyamide composition comprising:
(a) at least one polyamide mixture formed from
  (i) a polyamide 6,6, of which the amount of AEG is greater than the amount of CEG; and
  (ii) a blend of a first high chain-length polyamide having VN of $X_1$ and a second high chain-length polyamide having VN of $X_2$;
(b) at least one reinforcing filler;
(c) at least one heat stabilizer; and
(d) at least one ionic lubricant,
wherein $X_1$ is greater than $X_2$, the amount of AEG of the polyamide composition is at least 60 meq/kg, preferably at least 70 meq/kg, and VN of the polyamide composition is between 110 and 140 ml/g, preferably between 120 and 135 ml/g, wherein VN is measured in accordance with the standard ISO 307 in a 0.005 g/mL strength solution of polyamide at 25° C.

One of the essential features of the present invention is that a polyamide composition in the presence of at least one ionic lubricant may obtain appropriate flowability, while maintaining excellent chemical resistance, by reducing melt viscosity of the polyamide composition through incorporation of (ii) a blend of a first high chain-length polyamide having VN of $X_1$ and a second high chain-length polyamide having VN of $X_2$ into (i) a polyamide 6,6, wherein $X_1$ is greater than $X_2$.

In addition, according to certain embodiments of the present invention, it has been surprisingly found by the present inventors that use of a blend of two types of high chain-length polyamides endowed with different viscosity numbers, i.e. different range of melt viscosity, makes it possible to obtain superior $CaCl_2$ salt crack resistance of a polyamide composition as above detailed, comprising the same, compared to other polyamide compositions comprising only one type of high chain-length polyamide having VN of 122 to 160 ml/g, preferably 130 to 147 ml/g, which is in the range of standard melt viscosity appropriate for injection molding, without deteriorating other mechanical and thermal properties.

Other characteristics, details and advantages of the present invention will emerge even more fully upon reading the description which follows.

Throughout the description, including the claims, the term "comprising one" should be understood as being synonymous with the term "comprising at least one", unless specified otherwise, and "between" should be understood as being inclusive of the limits.

In the present invention, a "polyamide 6,6" is intended to denote, in particular, a polyamide comprising recurring units, at least 90% moles, preferably at least 95% moles of recurring units complying with the formula of —NH—$(CH_2)_6$—NH—CO—$(CH_2)_4$—CO—, which can be notably obtained via polycondensation reaction of hexamethylene diamine and adipic acid.

Each recurring unit of polyamide 6,6 can be all of the same type, or can be of more than one type, that is to say that polyamide 6,6 can be a homo-polyamide or a co-polyamide.

Preferably, polyamide 6,6 consists essentially of said recurring units, as above detailed, being understood that end-chain, defects and other irregularities can be present in the polyamide chain, without affecting the properties thereof.

Polyamide 6,6 may also comprise less than 10% moles, preferably less than 5% moles of additional recurring units other than —NH—$(CH_2)_6$—NH—CO—$(CH_2)_4$—CO—. Notably, polyamide 6,6 may comprise additional recurring units different from the one as defined above, which can be notably obtained through (1) polycondensation reaction of one of β-lactam, 5-amino-pentanoic acid, ε-caprolactam, 9-aminononanoic acid, 10-aminodecanoic acid, 11-aminoundecanoic acid, and 12-aminododecanoic acid and/or (2) polycondensation reaction of at least one of oxalic acid (HOOC—COOH), malonic acid (HOOC—$CH_2$—COOH), succinic acid [HOOC—$(CH_2)_2$—COOH], glutaric acid [HOOC—$(CH_2)_3$—COOH], adipic acid [HOOC—$(CH_2)_4$—COOH], 2,4,4-trimethyl-adipic acid [HOOC—CH$(CH_3)$—$CH_2$—C$(CH_3)_2$—$CH_2$—COOH], pimelic acid [HOOC—$(CH_2)_5$—COOH], suberic acid [HOOC—$(CH_2)_6$—COOH], azelaic acid [HOOC—$(CH_2)_7$—COOH], sebacic acid [HOOC—$(CH_2)_8$—COOH], undecanedioic acid [HOOC—$(CH_2)_9$—COOH], dodecandioic acid [HOOC—$(CH_2)_{10}$—COOH], tetradecandioic acid [HOOC—$(CH_2)_{12}$—COOH], and octadecandioic acid [HOOC—$(CH_2)_{16}$—COOH] with at least one of diamines, such as 1,4-diamino-1,1-dimethylbutane, 1,4-diamino-1-ethylbutane, 1,4-diamino-1,2-dimethylbutane, 1,4-diamino-1,3-dimethylbutane, 1,4-diamino-1,4-dimethylbutane, 1,4-diamino-2,3-dimethylbutane, 1,2-diamino-1-butylethane, 1,6-diaminohexane, 1,7-diaminoheptane, 1,8-diamino-octane, 1,6-diamino-2,5-dimethylhexane, 1,6-diamino-2,4-dimethylhexane, 1,6-diamino-3,3-dimethylhexane, 1,6-diamino-2,2-dimethylhexane, 1,9-diaminononane, 1,6-diamino-2,2,4-trimethylhexane, 1,6-diamino-2,4,4-trimethylhexane, 1,7-diamino-2,3-dimethylheptane, 1,7-diamino-2,4-dimethylheptane, 1,7-diamino-2,5-dimethylheptane, 1,7-diamino-2,2-dimethylheptane, 1,10-diaminodecane, 1,8-diamino-1,3-dimethyloctane, 1,8-diamino-1,4-dimethyloctane, 1,8-diamino-2,4-dimethyloctane, 1,8-diamino-3,4-dimethyloctane, 1,8-diamino-4,5-dimethyloctane, 1,8-diamino-2,2-dimethyloctane, 1,8-diamino-3,3-dimethyloctane, 1,8-diamino-4,4-dimethyloctane, 1,6-diamino-2,4-diethylhexane, 1,9-diamino-5-methylnonane, 1,11-diaminoundecane, and 1,12-diaminododecane.

Examples of the additional recurring units of polyamide 6,6 are notably:
(i) —NH—$(CH_2)_5$—CO—, i.e. recurring units which can be notably obtained via polycondensation reaction of ε-caprolactam;
(ii) —NH—$(CH_2)_8$—CO—, i.e. recurring units which can be notably obtained via polycondensation reaction of 9-aminononanoic acid;
(iii) —NH—$(CH_2)_9$—CO—, i.e. recurring units which can be notably obtained via polycondensation reaction of 10-aminodecanoic acid;
(iv) —NH—$(CH_2)_{10}$—CO—, i.e. recurring units which can be notably obtained via polycondensation reaction of 11-aminoundecanoic acid;
(v) —NH—$(CH_2)_{11}$—CO—, i.e. recurring units which can be notably obtained via polycondensation reaction of laurolactam;

(vi) —NH—(CH$_2$)$_6$—NH—CO—(CH$_2$)$_4$—CO—, i.e. recurring units which can be notably obtained via polycondensation reaction of hexamethylene diamine and adipic acid;

(vii) —NH—(CH$_2$)$_6$—NH—CO—(CH$_2$)$_8$—CO—, i.e. recurring units which can be notably obtained via polycondensation reaction of hexamethylene diamine and sebacic acid;

(viii) —NH—(CH$_2$)$_6$—NH—CO—(CH$_2$)$_{10}$—CO—, i.e. recurring units which can be notably obtained via polycondensation reaction of hexamethylene diamine and dodecandioic acid;

(ix) —NH—(CH$_2$)$_{10}$—NH—CO—(CH$_2$)$_{10}$—CO—, i.e. recurring units which can be notably obtained via polycondensation reaction of decamethylene diamine and dodecandioic acid;

(x) —NH—(CH$_2$)$_6$—NH—CO—(CH$_2$)$_7$—CO—, i.e. recurring units which can be notably obtained via polycondensation reaction of hexamethylene diamine and azelaic acid (otherwise known as nonandioic acid);

(xi) —NH—(CH$_2$)$_{12}$—NH—CO—(CH$_2$)$_{10}$—CO—, i.e. recurring units which can be notably obtained via polycondensation reaction of dodecamethylene diamine and dodecandioic acid;

(xii) —NH—(CH$_2$)$_{10}$—NH—CO—(CH$_2$)$_8$—CO—, i.e. recurring units which can be notably obtained via polycondensation reaction of decamethylene diamine and decandioic acid;

(xiii) —NH—(CH$_2$)$_4$—NH—CO—(CH$_2$)$_4$—CO—, i.e. recurring units which can be notably obtained via polycondensation reaction of 1,4-butanediamine and adipic acid; and (xiv) —NH—(CH$_2$)$_4$—NH—CO—(CH$_2$)$_8$—CO—, i.e. recurring units which can be notably obtained via polycondensation reaction of 1,4-butanediamine and sebacic acid.

In the present invention, the term "high chain-length polyamide" is intended to denote, in particular, a polyamide comprising recurring units, at least 50% moles of said recurring units complying with any of formula (I) or formula (II) [recurring units (R$_{PAL}$)]:

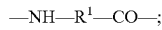    formula (I):

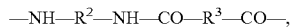    formula (II):

wherein

R$^1$, equal to or different from each other at each occurrence, is a divalent hydrocarbon group having from 6 to 17 carbon atoms and wherein R$^2$ and R$^3$, equal to or different from each other at each occurrence, are divalent hydrocarbon groups, with the proviso that at least one of following conditions is satisfied:

R$^2$ has from 7 to 18 carbon atoms; and

R$^3$ has from 5 to 16 carbon atoms.

The first high chain-length polyamide and the second high chain-length polyamide may have same monomer constituents, and different VN, as above detailed, or may differ both because of monomer constituents and VN.

As a consequence, the preferred embodiments below detailed for the high chain-length polyamide are independently applicable to both said first high chain-length polyamide and said second high chain-length polyamide.

According to certain embodiments, the first high chain-length polyamide and the second high chain-length polyamide will have same monomer constituents, i.e. will be of essentially same type but differing because of their viscosity numbers X$_1$ and X$_2$.

According to other embodiments, the first high chain-length polyamide and the second high chain-length polyamide will differ in their monomer constituents, i.e. will be different polyamides further differing because of their viscosity numbers X$_1$ and X$_2$.

The high chain-length polyamide of the inventive composition is preferably an aliphatic polyamide, that is to say that R$^1$, R$^2$ and R$^3$ are aliphatic groups.

Recurring units (R$_{PAL}$) of the high chain-length polyamide can be notably obtained through (1) polycondensation reaction of one of 9-aminononanoic acid, 10-aminodecanoic acid, 11-aminoundecanoic acid, 12-aminododecanoic acid and/or (2) polycondensation reaction of one of pimelic acid [HOOC—(CH$_2$)$_5$—COOH], suberic acid [HOOC—(CH$_2$)$_6$—COOH], azelaic acid [HOOC—(CH$_2$)$_7$—COOH], sebacic acid [HOOC—(CH$_2$)$_8$—COOH], undecanedioic acid [HOOC—(CH$_2$)$_9$—COOH], dodecandioic acid [HOOC—(CH$_2$)$_{10}$—COOH], tetradecandioic acid [HOOC—(CH$_2$)$_{12}$—COOH], octadecandioic acid [HOOC—(CH$_2$)$_{16}$—COOH] with one of 1,6-diaminohexane, 1,7-diaminoheptane, 1,8-diamino-octane, 1,6-diamino-2,5-dimethylhexane, 1,6-diamino-2,4-dimethylhexane, 1,6-diamino-3,3-dimethylhexane, 1,6-diamino-2,2-dimethylhexane, 1,9-diaminononane, 1,6-diamino-2,2,4-trimethylhexane, 1,6-diamino-2,4,4-trimethylhexane, 1,7-diamino-2,3-dimethylheptane, 1,7-diamino-2,4-dimethylheptane, 1,7-diamino-2,5-dimethylheptane, 1,7-diamino-2,2-dimethylheptane, 1,10-diaminodecane, 1,8-diamino-1,3-dimethyloctane, 1,8-diamino-1,4-dimethyloctane, 1,8-diamino-2,4-dimethyloctane, 1,8-diamino-3,4-dimethyloctane, 1,8-diamino-4,5-dimethyloctane, 1,8-diamino-2,2-dimethyloctane, 1,8-diamino-3,3-dimethyloctane, 1,8-diamino-4,4-dimethyloctane, 1,6-diamino-2,4-diethylhexane, 1,9-diamino-5-methylnonane, 1,11-diaminoundecane, and 1,12-diaminododecane.

Exemplary recurring units (R$_{PAL}$) of the high chain-length polyamide are notably:

(i) —NH—(CH$_2$)$_8$—CO—, i.e. recurring units which can be notably obtained via polycondensation reaction of 9-aminononanoic acid;

(ii) —NH—(CH$_2$)$_9$—CO—, i.e. recurring units which can be notably obtained via polycondensation reaction of 10-aminodecanoic acid;

(iii) —NH—(CH$_2$)$_{10}$—CO—, i.e. recurring units which can be notably obtained via polycondensation reaction of 11-aminoundecanoic acid;

(iv) —NH—(CH$_2$)$_{11}$—CO—, i.e. recurring units which can be notably obtained via polycondensation reaction of laurolactam;

(v) —NH—(CH$_2$)$_6$—NH—CO—(CH$_2$)$_8$—CO—, i.e. recurring units which can be notably obtained via polycondensation reaction of hexamethylene diamine and sebacic acid;

(vi) —NH—(CH$_2$)$_6$—NH—CO—(CH$_2$)$_{10}$—CO—, i.e. recurring units which can be notably obtained via polycondensation reaction of hexamethylene diamine and dodecandioic acid;

(vii) —NH—(CH$_2$)$_{10}$—NH—CO—(CH$_2$)$_{10}$—CO—, i.e. recurring units which can be notably obtained via polycondensation reaction of decamethylene diamine and dodecandioic acid;

(viii) —NH—(CH$_2$)$_6$—NH—CO—(CH$_2$)$_7$—CO—, i.e. recurring units which can be notably obtained via polycondensation reaction of hexamethylene diamine and azelaic acid (otherwise known as nonandioic acid);

(ix) —NH—(CH$_2$)$_{12}$—NH—CO—(CH$_2$)$_{10}$—CO—, i.e. recurring units which can be notably obtained via polycondensation reaction of dodecamethylene diamine and dodecandioic acid;

(x) —NH—(CH$_2$)$_{10}$—NH—CO—(CH$_2$)$_8$—CO—, i.e. recurring units which can be notably obtained via polycondensation reaction of decamethylene diamine and decandioic acid; and (xi) —NH—(CH$_2$)$_6$—NH—CO—(CH$_2$)$_{16}$—CO—, i.e. recurring units which can be notably obtained via polycondensation reaction of hexamethylene diamine and octadecandioic acid.

The high chain-length polyamide may comprise recurring units different from recurring units (R$_{PAL}$), as defined above. Notably, the high chain-length polyamide may comprise recurring units (R$_{PAS}$) of shorter length, generally complying with any of formulae (III) and (IV):

—NH—R$^4$—CO—;  formula (III)

—NH—R$^5$—NH—CO—R$^6$—CO—,  formula (IV):

wherein:
R$^4$, equal to or different from each other at each occurrence, is a divalent hydrocarbon group having 5 carbon atoms or less;
and wherein R$^5$ and R$^6$, equal to or different from each other at each occurrence, are divalent hydrocarbon groups, with the proviso that at least one of following conditions is satisfied:
R$^5$ has less than 7 carbon atoms; and
R$^6$ has less than 5 carbon atoms.

Recurring units (R$_{PAS}$) of the polyamide can be notably obtained through (1) polycondensation reaction of one of β-lactam, 5-amino-pentanoic acid, and ε-caprolactam, and/or (2) polycondensation reaction of at least one of 1,2-diaminoethane, 1,2-diaminopropane, propylene-1,3-diamine, 1,3-diaminobutane, 1,4-diaminobutane, 1,5-diaminopentane, 1,4-diamino-1,1-dimethylbutane, 1,4-diamino-1-ethylbutane, 1,4-diamino-1,2-dimethylbutane, 1,4-diamino-1,3-dimethylbutane, 1,4-diamino-1,4-dimethylbutane, 1,4-diamino-2,3-dimethylbutane, 1,2-diamino-1-butylethane, and 1,6-diaminohexane with a diacid and/or (3) polycondensation reaction of at least one diamine with at least one of oxalic acid (HOOC—COOH), malonic acid (HOOC—CH$_2$—COOH), succinic acid [HOOC—(CH$_2$)$_2$—COOH], glutaric acid [HOOC—(CH$_2$)$_3$—COOH], and adipic acid [HOOC—(CH$_2$)$_4$—COOH].

Non limitative examples of recurring units (R$_{PAS}$) of the polyamide are notably:
(i) —NH—(CH$_2$)$_5$—CO—, i.e. recurring units which can be notably obtained via polycondensation reaction of ε-caprolactam; and
(ii) —NH—(CH$_2$)$_4$—NH—CO—(CH$_2$)$_4$—CO—, i.e. recurring units which can be notably obtained via polycondensation reaction of 1,4-butanediamine and adipic acid.

Preferably, the high chain-length polyamide consists essentially of recurring units (R$_{PAL}$), as above detailed, being understood that end-chain, defects and other irregularities can be present in the polyamide chain, without this affecting the properties thereof.

Recurring units (R$_{PAL}$) of the polyamide can be all of the same type, or can be of more than one type, that is to say that the polyamide can be a homo-polyamide or a co-polyamide.

Specific examples of the high chain-length polyamides (PA) which can be advantageously used in the hereby provided composition are notably:
polyamide 11 (consisting essentially of recurring units of type (iii) as above detailed);
polyamide 12 (consisting essentially of recurring units of type (iv) as above detailed);
polyamide 12,12 (consisting essentially of recurring units of type (ix) as above detailed);
polyamide 6,12 (consisting essentially of recurring units of type (vi) as above detailed);
polyamide 6,10 (consisting essentially of recurring units of type (v) as above detailed);
polyamide 6,18 (consisting essentially of recurring units of type (xi) as above detailed)
polyamide 10,10 (consisting essentially of recurring units of type (x) as above detailed);
polyamide 10,12 (consisting essentially of recurring units of type (vii) as above detailed);
and mixtures thereof.

Particularly, polyamide 11, polyamide 12, polyamide 6,10, polyamide 6,12, polyamide 6,18, polyamide 10,10, polyamide 10,12, polyamide 12,12, or any mixtures thereof can be used in the present invention. Polyamide 6,10 can be most preferably used in the polyamide composition according to the present invention. According to certain preferred embodiments, at least one of the said first high chain-length polyamide and the said second high chain-length polyamide is a polyamide 6,10, as above detailed.

According to certain more preferred embodiments both said first high chain-length polyamide and the said second high chain-length polyamide is a polyamide 6,10, as above detailed.

Particularly preferred polyamide mixture to be used in the composition of the present invention is formed from (i) a polyamide 6,6 and (ii) a blend of a first high chain-length polyamide having VN of X$_1$ and a second high chain-length polyamide having VN of X$_2$, wherein X$_1$ is greater than X$_2$, wherein the weight ratio of said (i) polyamide 6,6 to said (ii) blend of high chain-length polyamides is comprised between about 5:5 and about 3:7, preferably about 4:6, and/or wherein the weight ratio of said first high chain-length polyamide to said second high chain-length polyamide is comprised between about 5:2 and about 3:1, preferably about 3:1.

In a particular embodiment of the present invention, (i) a polyamide 6,6, of which the amount of AEG is greater than the amount of CEG, is used.

In another particular embodiment of the present invention, X$_1$ is between 122 and 160 ml/g, preferably between 130 and 147 ml/g, and/or X$_2$ is between 95 and 120 ml/g, preferably between 102 and 118 ml/g.

When equimolar amounts of end groups are present, increasing the amount of both end groups improves stability, whereas when an excess of AEG is present, exposure to oxidation conditions results in a decrease of the amount of AEG and slower degradation, and when an excess of CEG is present, exposure to oxidation conditions results in an increase of the amount of CEG and rapid degradation. That is to say, when prepared using a stoichiometric balance of diamine and dicarboxylic acid, absent side reactions occurring during the polymerization, the resulting resin will have a substantial balance of AEG and CEG. Where an excess of one of the monomers is employed, however, one end group will predominate. For example, polymerizing a diamine-rich monomer mixture will result in a polymer with a greater amount of AEG.

The methods to determine end group concentration of a polyamide are described comprehensively in the literature, particularly in Nylon Plastics Handbook by Melvin. I. Kohan (Hanser, 1995, 79-80 p).

The amount of acid end groups are typically determined by a method, wherein a 2-4% solution in benzyl alcohol is titrated with 0.01 to 0.1N KOH in benzyl alcohol or ethylene glycol at a temperature between 50 and 185° C. The amount of amine end groups are determined by titrating a 2% nylon solution in a phenol/methanol/water mixture (50:25:25 by volume) with 0.1N hydrochloric acid. The end point is determined visually with phenolphthalein, potentiometrically, or conductometrically. A parallel blank with no polymer must be run to account for the conversion of benzyl alcohol to benzoic acid for the determination of acid end groups and blank corrections must be made as well for the determination of amine end groups. Trifluoroethanol ("TFE") can be used as solvent in case of polyamide 6 or polyamide 6,6.

Examples of the method to determine the amounts of AEG and CEG of polyamide 6,6 include a method wherein a predetermined amount of sample is dissolved in a mixture of TFE and chloroform. The amounts of AEG and CEG are determined by a back titration.

While not being bound by any particular theory, it is believed that use of a blend of a first high chain-length polyamide having VN of $X_1$ and a second high chain-length polyamide having VN of $X_2$ contributes to the flowability of a polyamide composition, which is appropriate for injection molding even in the presence of at least one ionic lubricant, wherein $X_1$ is greater than $X_2$, and VN is measured in accordance with the standard ISO 307 in a 0.005 g/mL strength solution of polyamide at 25° C., while attaining excellent mechanical and thermal properties.

In a particular embodiment of the present invention, the amount of AEG of (i) a polyamide 6,6 is preferably greater than or equal to 50 meq/kg, more preferably greater than or equal to 70 meq/kg. The difference between the amounts of AEG and CEG in (i) a polyamide 6,6 is preferably greater than or equal to 5 meq/kg, more preferably greater than 10 meq/kg, in particular greater than or equal to 40 meq/kg.

In another particular embodiment of the present invention, the amount of AEG of the polyamide composition is at least 60 meq/kg, preferably at least 70 meq/kg.

In a more particular embodiment of the present invention, VN of the polyamide composition is between 110 and 140 ml/g, preferably between 120 and 135 ml/g.

In a particular embodiment of the present invention, an amount of (a) at least one polyamide mixture is preferably 40.0 to 95.0% by weight (wt %), more preferably 60.0 to 70.0 wt % relative to the total weight of the polyamide composition.

In a certain embodiment of the present invention, an amount of said (i) polyamide 6,6, of which the amount of AEG is greater than the amount of CEG, is preferably 15.0 to 35.0 wt %, more preferably 25.0 to 30.0 wt % relative to the total weight of the polyamide composition, and the amount of said (ii) blend of said first high chain-length polyamide having VN of $X_1$ and said second high chain-length polyamide having VN of $X_2$ is 25.0 to 60.0 wt %, more preferably 35.0 to 40.0 wt % relative to the total weight of the polyamide composition.

In the present invention, the term "reinforcing filler" is intended to denote, in particular, a material added to a polymer composition to improve its properties, such as rigidity, tensile strength, impact resistance and dimensional stability, and/or to reduce the cost. By appropriately selecting these materials, not only the economics but also other properties such as processing and mechanical behavior can be improved. Although these fillers retain their inherent characteristics, very significant differences are often observed depending on the molecular weight, compounding technique and the presence of other additives in the formulation. Therefore, once the basic property requirements are established, the optimum type and the loading level of the filler for the balance between cost and performance must be determined.

In the present invention, (b) at least one reinforcing filler is preferably selected from the group consisting of glass fibers, glass beads, calcium carbonate, silicates, talc, kaolin, mica, wood powders, and powders and fibers of other natural products, and synthetic fibers. Glass fibers are most advantageously used in the polyamide composition of the present invention.

In a particular embodiment of the present invention, an amount of (b) at least one reinforcing filler is from 1.0 to 60.0 wt %, preferably from 15.0 to 50.0 wt % with respect to the total weight of the composition.

In the present invention, the term "heat stabilizer" is intended to denote, in particular, a material added to a polymer composition to improve thermal stability by preventing thermo-oxidative degradation during processing.

In the present invention, (c) at least one heat stabilizer is preferably selected from the group consisting of hindered phenol compounds, hindered amine compounds, phosphorous compounds, copper-containing compounds, and combinations thereof, preferably a combination of a hindered phenol compound and a phosphorous compound, more preferably copper-containing compounds.

The term "hindered phenol compound" is used according to its customary meaning in this field and generally intended to denote derivatives of ortho-substituted phenol, especially (but not limited to) di-tert-butyl-phenol derivatives, well known in the art.

Examples of hindered phenol compounds are listed in Table A below:

TABLE A

| | Formula |
|---|---|
| (a1) tetrakis(3-(3,5-di-tert-butyl-4-hydroxyphenyl)propionate), commercially available, notably as Irganox ® 1010 stabilizer from BASF | |
| (a2) thiodiethylene bis[3-(3,5-di-tert-butyl-4-hydroxy-phenyl)propionate], commercially available, notably as Irganox ® 1035 stabilizer from BASF | |
| (a3) octadecyl-3-(3,5-di-tert-butyl-4-hydroxyphenyl)-propionate, commercially available, notably as Irganox ® 1076 stabilizer from BASF | |
| (a4) N,N'-hexane-1,6-diyl-bis(3-(3,5-di-tert-butyl-4-hydroxyphenylpropionamide)), commercially available, notably as Irganox ® 1098 stabilizer from BASF | |
| (a5) 1,3,5-trimethyl-2,4,6-tris(3,5-di-tert-butyl-4-hydroxybenzyl)benzene, commercially available, notably as Irganox ® 1330 stabilizer from BASF | |
| (a6) benzenepropanoic acid, 3,5-bis(1,1-dimethylethyl)-4-hydroxy-C7-C9 branched alkyl esters, commercially available, notably as Irganox ® 1135 stabilizer from BASF | |

TABLE A-continued

| | Formula |
|---|---|
| (a7) hexamethylene bis[3-(3,5-di-tert-butyl-4-hydroxyphenyl)propionate], commercially available, notably as Irganox ® 259 stabilizer from BASF | |
| (a8) tris(3,5-di-tert-butyl-4-hydroxybenzyl) isocyanurate, commercially available, notably as Irganox ® 3114 stabilizer from BASF | |
| (a9) 2,6-di-tert-butyl-4-(4,6-bis(octylthio)-1,3,5-triazin-2-ylamino)phenol, commercially available, notably as Irganox ® 565 stabilizer from BASF | |
| (a10) commercially available, notably as Irganox ® 1425 stabilizer from BASF | |
| (a11) 2-methyl-4,6-bis(octylsulfanylmethyl)phenol, commercially available, notably as Irganox ® 1520 stabilizer from BASF | |

TABLE A-continued

| | Formula |
|---|---|
| (a12) 2,4-bis(dodecylthiomethyl)-6-methylphenol, commercially available, notably as Irganox ® 1726 stabilizer from from BASF | 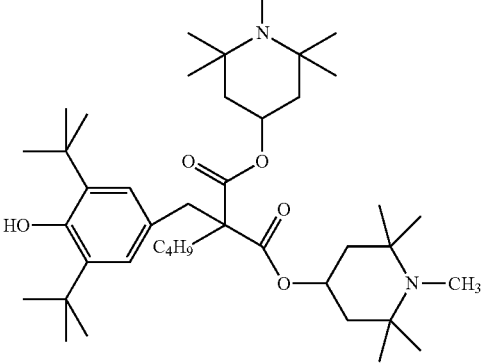 |
| (a13) triethylene glycol bis(3-tert-butyl-4-hydroxy-5-methylphenyl)propionate, commercially available, notably as Irganox ® 245 stabilizer from BASF | 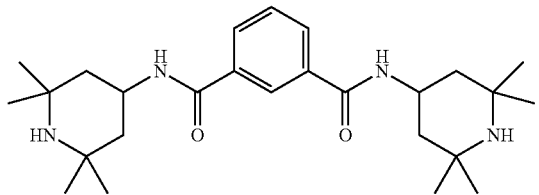 |

The term "hindered amine compound" is used according to its customary meaning in this field and generally intended to denote derivatives of 2,2,6,6-tetramethyl piperidine well known in the art (see for example: *Plastics Additives Handbook*, 5$^{th}$ ed., Hanser, 2001). The hindered amine compound of the composition according to the present invention may either be of low or high molecular weight.

The hindered amine compounds of low molecular weight have typically a molecular weight of at most 900, preferably at most 800, more preferably of at most 700, still more preferably at most 600, and most preferably of at most 500 g/mol.

Examples of low molecular weight hindered amine compounds are listed in Table B below:

TABLE B

Formula

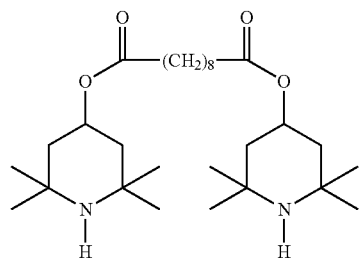

TABLE B-continued

| Formula |
|---|
| (b4) |
| (b5) |
| (b6) |
| (b7) |
| (b8) |

TABLE B-continued
Formula
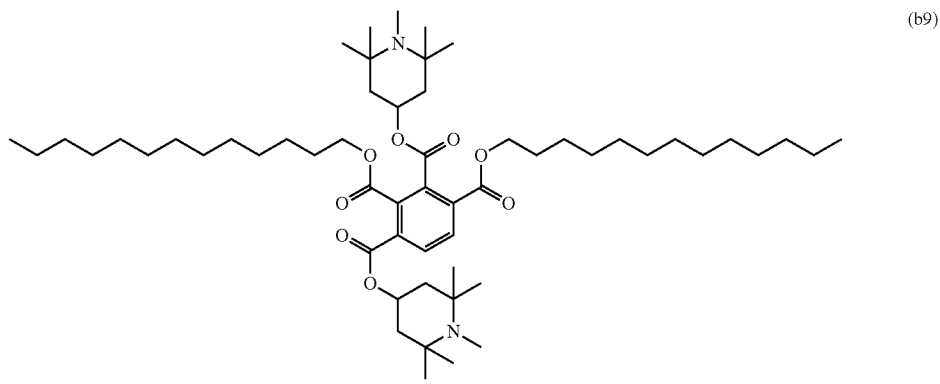
(b9)
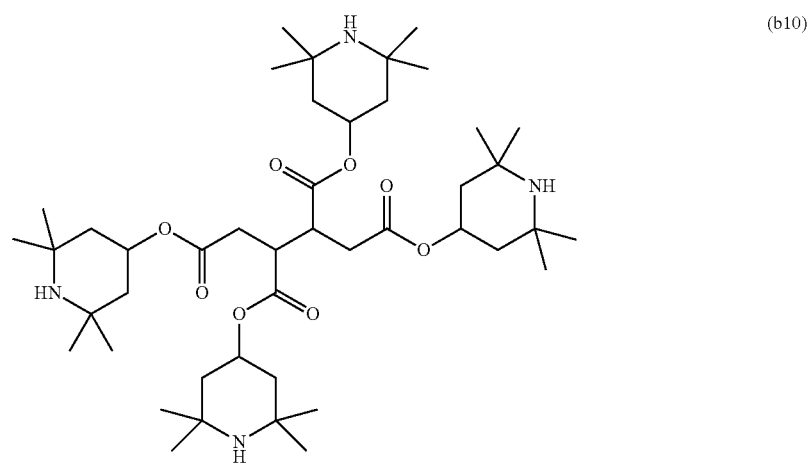
(b10)
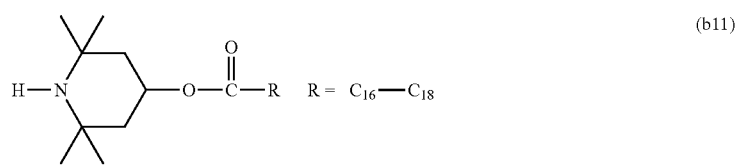
(b11)
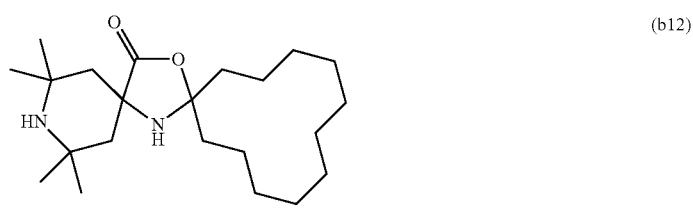
(b12)

The hindered amine compounds of high molecular weight are typically polymeric and have typically a molecular weight of at least 1000, preferably at least 1100, more preferably of at least 1200, still more preferably at least 1300, and most preferably of at least 1400 g/mol.

Examples of high molecular weight hindered amine compounds are listed in Table C below:

TABLE C

Formula (c1)

(c2)

(c3)

(c4)

(c5)

TABLE C-continued

Formula

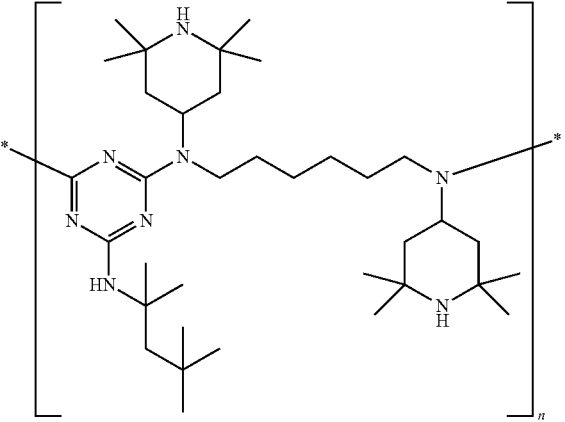

(c6)

The "n" in the formulas (c1) to (c6) of Table C indicates the number of repeating units in the polymer and is usually an integral equal or greater than 4.

In the present invention, (c) at least one heat stabilizer may be at least one phosphorous compound selected from the group consisting of an alkali or alkali earth metal hypophosphites, phosphite esters, phosphonites and mixtures thereof.

Sodium and calcium hypophosphites are preferred alkali or alkali earth metal hypophosphites.

A phosphite ester may be represented by the formula $P(OR)_3$, while a phosphonite may be represented by the formula $P(OR)_2R$, wherein each of R, can be the same or different and are typically independently selected from the group consisting of a $C_{1-20}$ alkyl, $C_{3-22}$ alkenyl, $C_{6-40}$ cycloalkyl, $C_{7-40}$ cycloalkylene, aryl, alkaryl or arylalkyl moiety.

Examples of phosphite esters are listed in the Table D below:

TABLE D

Formula

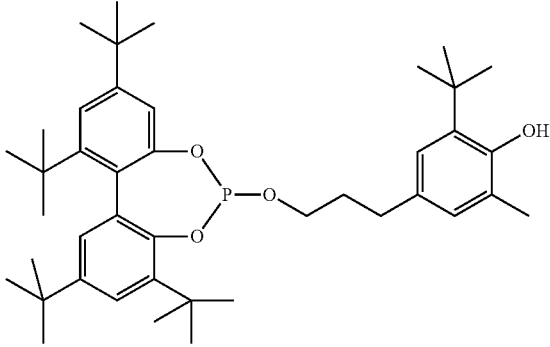 [SMILES: Cc1cc(CCCOp2oc3cc(C(C)(C)C)cc(C(C)(C)C)c3c3cc(C(C)(C)C)cc(C(C)(C)C)c3o2)cc(C(C)(C)C)c1O]

(d1)

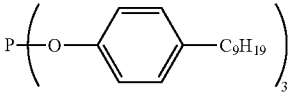

(d2)

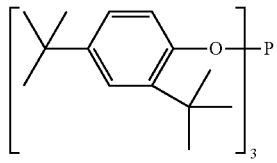

(d3)

TABLE D-continued

| Formula | |
|---|---|
| (structure) | (d4) |
| (structure) | (d5) |
| (structure) | (d6) |
| (structure) | (d7) |
| (structure) | (d8) |
| (structure) | (d9) |

TABLE D-continued
| Formula | |
|---|---|
| 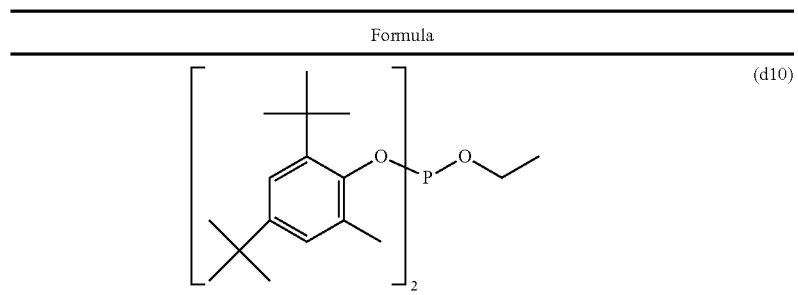 | (d10) |
| 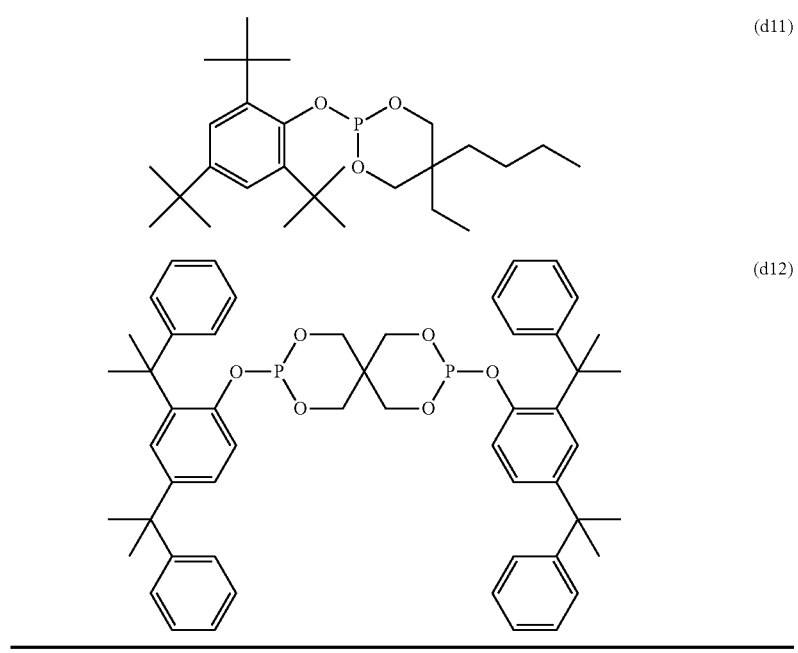 | (d11) |
| | (d12) |
Examples of phosphonites are listed in the Table E below:
TABLE E
| Formula | |
|---|---|
| 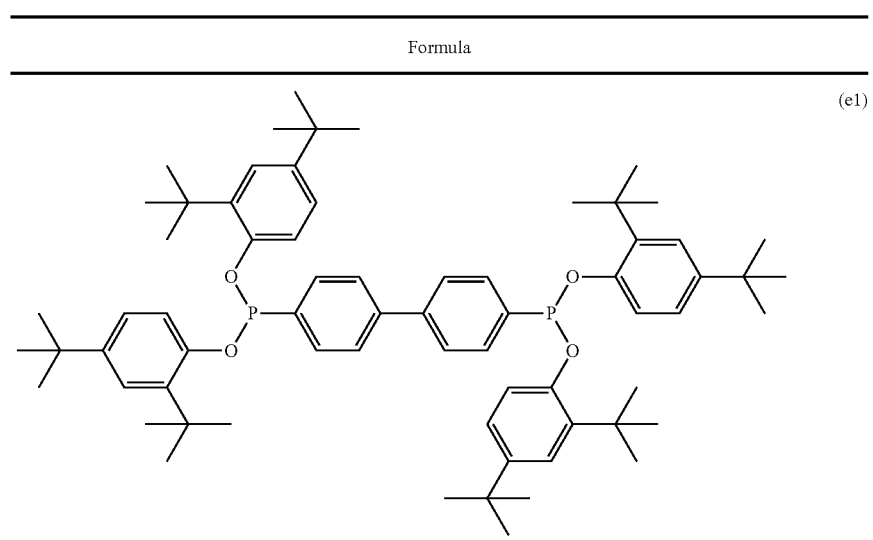 | (e1) |

TABLE E-continued

Formula

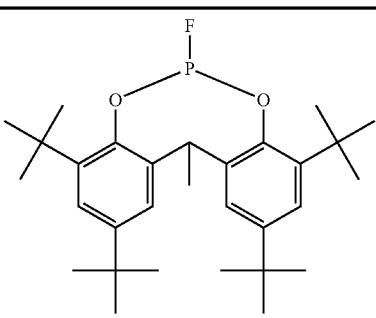

(e2)

The copper-containing stabilizer, which can be used for a polyamide composition according to the present invention, is further characterized as comprising a copper compound soluble in the polyamide and an alkali metal halide. More particularly, the copper-containing stabilizer consists essentially of a copper compound selected from the group consisting of copper (I) oxide, copper (II) oxide, copper (I) salt, for example cuprous acetate, cuprous stearate, a cuprous organic complex compound such as copper acetylacetonate, a cuprous halide or the like; and an alkali metal halide. According to certain preferred embodiments, the copper-containing stabilizer will consist essentially of a copper halide selected from copper iodide and copper bromide and an alkali metal halide selected from the group consisting of iodides and bromides of Li, Na, and K. Stabilizing formulations comprising copper (I) iodide and potassium iodide are well known and commercially available for use in stabilizing polyamides, preferably aliphatic polyamides including polyamide 6, polyamide 6,6, polyamide 6,10, and the like.

In a particular embodiment of the present invention, a hindered amine light stabilizer (HALS) can be used in combination with a hindered phenol compound and a hindered amine compound.

A preferred combination is the combination of a hindered phenol compound and a phosphorous compound.

A particularly preferred combination is the combination of CuI and KI. Another very advantageous combination is the mixture of $Cu_2O$ and KBr.

In the present invention, the weight ratio of copper (I) halide to alkali metal halide is in the range of from about 1:2.5 to about 1:20, preferably from about 1:3 to about 1:10, more preferably about 1:5.

In a particular embodiment of the present invention, an amount of (c) at least one heat stabilizer is from 0.05 to 3.0 wt %, preferably from 0.1 to 2.0 wt % with respect to the total weight of the composition.

In the present invention, the term "ionic lubricant" is intended to denote, in particular, an ionic material added to a polymer composition to facilitate the flow of the melt by reducing internal friction and to prevent a polyamide molding composition from adhering to the surface of a mold.

In the present invention, the (d) at least one ionic lubricant is selected from the group consisting of aluminum salts, zinc salts, alkali metal salts, alkaline earth metal salts, or esters or amides, of fatty acids having 10 to 44 carbon atoms, preferably having 12 to 30 carbon atoms. Preferred metal salts are calcium stearate, zinc stearate, magnesium stearate, and aluminum stearate, particular preference being given to aluminum stearate.

In a particular embodiment of the present invention, an amount of (d) at least one ionic lubricant is from 0.05 to 1.0 wt %, preferably from 0.1 to 0.5 wt % with respect to the total weight of the composition.

Further, the polyamide composition of the present invention may optionally comprise (e) at least one additive usually used in the polyamide-based compositions in addition to the above components (a)-(d). In particular, the polyamide composition according to the present invention may further comprise one or more additives selected from the group consisting of a colorant, a UV stabilizer, a flame retardant, a plasticizer, an impact modifier, a coupling agent, a crosslinking agent, a nucleating agent, a surfactant, an antistatic agent, a dye, a pigment, and any combinations thereof. In a particular embodiment of the present invention, the polyamide composition according to the present invention comprises at least one chain extender and at least one dye.

In the present invention, an amount of additive(s) may be from 0 to 3.0 wt %, preferably from 0.1 to 2.0 wt %, and more preferably from 0.5 to 1.5 wt % with respect to the total weight of the polyamide composition.

In a preferred embodiment of the present invention, the polyamide composition preferably comprises:
(a) at least one polyamide mixture formed from
 (i) a polyamide 6,6, the amount of AEG being greater than the amount of CEG; and
 (ii) a blend of a first high chain-length polyamide having VN of between 130 and 147 ml/g and a second high chain-length polyamide having VN of between 102 and 118 ml/g;
(b) glass fibers as reinforcing fillers;
(c) CuI/KI as a heat stabilizer;
(d) aluminum stearate as an ionic lubricant; and
(e) optionally at least one additive,
 wherein VN is measured in accordance with the standard ISO 307 in a 0.005 g/mL strength solution of polyamide at 25° C.

In another preferred embodiment of the present invention, the polyamide composition preferably comprises:
(a) at least one polyamide mixture formed from
 (i) a polyamide 6,6, the amount of AEG being greater than the amount of CEG; and
 (ii) a blend of a first high chain-length polyamide having VN of between 130 and 147 ml/g and a second high chain-length polyamide having VN of between 102 and 118 ml/g;
(b) glass fibers as reinforcing fillers;
(c) CuI/KI as a heat stabilizer;

(d) aluminum stearate as an ionic lubricant; and
(e) optionally at least one additive,
wherein the amount of AEG of the polyamide composition is at least 60 meq/kg, preferably at least 70 meq/kg, and VN of the polyamide composition is between 110 and 140 ml/g, preferably between 120 and 135 ml/g, wherein VN is measured in accordance with the standard ISO 307 in a 0.005 g/mL strength solution of polyamide at 25° C.

In a particularly preferred embodiment of the present invention, the polyamide composition preferably comprises:
(a) 50.0 to 70.0 wt % of at least one polyamide mixture formed from
  (i) a polyamide 6,6, of which the amount of AEG is greater than or equal to 70 meq/kg and the difference between the amounts of AEG and CEG is greater than or equal to 40 meq/kg; and
  (ii) a blend of a first polyamide 6,10 having VN of between 130 and 147 ml/g and a second polyamide 6,10 having VN of between 102 and 118 ml/g;
(b) 29.3 to 46.0 wt % of glass fibers in the chopped form with the weight average length of about 3 mm;
(c) 0.1 to 2.0 wt % of CuI/KI with the weight ratio of CuI:KI being about 1:5;
(d) 0.1 to 0.5 wt % of aluminum stearate; and
(e) 0.5 to 1.5 wt % of at least one additive,
wherein the total amount of (a)-(e) is 100 wt % of the polyamide composition, and VN of the polyamide composition is between 110 and 140 ml/g, preferably between 120 and 135 ml/g, wherein VN is measured in accordance with the standard ISO 307 in a 0.005 g/mL strength solution of polyamide at 25° C.

The polyamide composition of the present invention can be obtained by mixing the various components generally in a single or twin screw extruder at a temperature sufficient to maintain the polyamide resin in the melt. Generally, the mixture is extruded into rods which are cut into pieces to form granules or pellets. Additives may be added together or separately by mixing polyamide hot or cold. Thusly-obtained granules or pellets can be further processed to powder form, for instance, by a grinding with liquid nitrogen.

The obtained polyamide composition can be used as raw material for manufacturing articles exhibiting enhanced chemical resistance, notably $CaCl_2$ salt crack resistance, in particular radiator end tank. The polyamide composition of the present invention may attain particularly excellent $CaCl_2$ salt crack resistance.

The polyamide composition according to the present invention shows good chemical resistance, notably with respect to $CaCl_2$, $ZnCl_2$, and ethylene glycol, while maintaining advantageous mechanical properties, and therefore can be advantageously used for the articles intended for automobile or electrical components. The present invention also relates to articles or parts of articles comprising the polyamide composition according to the present invention.

The articles according to the invention are advantageously automobile engine components such as radiator end tank, air intake manifold, water pump body, intercooler air duct, timing belt cover, electrical connector, and engine cover in an automobile, which are to be exposed to high temperature during their lifecycle. The polyamide composition according to the present invention, which is capable of exhibiting excellent heat resistance, i.e., high performance retention of mechanical properties such as tensile strength (TS) to break and Charpy impact strength after thermal aging, good spiral flow, and minimum distortion during injection molding as well as low moisture content and excellent salt crack resistance, is particularly well suited for the manufacture of the above mentioned articles.

Another aspect of the present invention is thus related to molded parts produced by injection molding of the present polyamide composition.

Another aspect of the present invention relates to use of the molded parts to produce engine components such as radiator end tank, air intake manifold, water pump body, intercooler air duct, timing belt cover, electrical connector, and engine cover, preferably radiator end tank for an automobile exhibiting enhanced chemical resistance, notably $CaCl_2$ salt crack resistance.

Further aspect of the present invention is related to use of a blend of high chain-length polyamides comprising two types of high chain-length polyamide having different melt viscosity to secure flowability and performance required during injection molding of a polyamide composition comprising at least one ionic lubricant.

The articles according to the present invention are advantageously formed by injection molding. Various molding techniques may be used to form articles or parts of articles from the composition. Powders, pellets, beads, flakes, reground materials or other forms of the composition may be molded, with or without liquid or other additives, premixed or fed separately. Exact conditions may be determined by trial and error. Upper temperature limits may be estimated from thermal analysis such as thermogravimetric analysis (TGA). Lower temperature limits may be estimated from Tg as measured, for example, by dynamic mechanical thermal analysis (DMTA), differential scanning calorimetry (DSC), and the like. One skilled in the art will recognize the factors influencing injection moldability including the material's stress relaxation properties and the temperature dependence of melt viscosity.

While preferred embodiments of this invention have been shown and described, modifications thereof can be made by one skilled in the art without departing from the teaching of this invention. The embodiments and examples described herein are exemplary only and are not limiting. Many variations and modifications of systems and methods are possible and are within the scope of the invention. Accordingly, the scope of protection is not limited to the embodiments described herein, but is only limited by the claims that follow, the scope of which shall include all equivalents of the subject matter of the claims. Further details and advantages of the invention will become apparent from the examples given below for illustrative purposes only.

EXAMPLES

Example 1

Preparation of Polyimide Composition 1 (Hereinafter, Ex.1)

Example 2(Comparative)

Preparation of Polyimide Compositions 2 & 3 (hereinafter, Comp.Ex.1 and Ex.2)

The polyamide composition was prepared by mixing the components indicated in Table 1 below in a twin-screw extruder (internal diameter 30 mm; L/D=30) and subsequently extruding the mixture. The temperature profile of the extruder was between 260 and 280° C., and the extrusion speed was between 250 and 300 rpm under vacuum of 50-70 cmHg.

TABLE 1

| Components | Ex. 1 | Comp. Ex. 1 | Comp. Ex. 2 |
|---|---|---|---|
| PA66[1] | 25.70 wt % | 25.70 wt % | 25.70 wt % |
| PA610[2] | 29.00 wt % | 39.00 wt % | 39.00 wt % |
| PA610[3] | 10.00 wt % | — | — |
| GF[4] | 33.00 wt % | 33.00 wt % | 33.00 wt % |
| CuI/KI[5] | 0.60 wt % | 0.60 wt % | 0.60 wt % |
| Al stearate | 0.20 wt % | 0.20 wt % | — |
| Stearic acid | — | — | 0.20 wt % |
| Additives | 1.50 wt % | 1.50 wt % | 1.50 wt % |

[1] Polyamide 6,6: STABAMID® 25FS2 PA66 available from Solvay Polyamide & Intermediates (the amount of AEG = 102.4 meq/kg; the amount of CEG = 37.8 meq/kg);
[2] Polyamide 6,10: STABAMID® 28CE2 available from Solvay Polyamide & Intermediates (VN = 130 to 147 ml/g);
[3] Polyamide 6,10: STABAMID® 24CE1 available from Solvay Polyamide & Intermediates (VN = 102 to 119 ml/g);
[4] Glass fibers: ECS 301X1 available from Chongqing Polycomp International Corp. (CPIC);
[5] CuI/KI: MM8629F available from Solvay Chemicals Korea.

Example 3

Modified Denso—CaCl₂ Stress Cracking Resistance

Dumbbell specimens were subjected to cycles of 4 hours in a chamber at a pressure of 19 MPa and at a temperature of 100° C. An aqueous solution comprising 50 wt % of $CaCl_2$ was sprayed to the samples 3 times a day (5 ml/day). One of the ends of the samples was subjected to stress by a weight of 660 g. Cracks were observed on the surfaces after 138 cycles for Comp. Ex.2, whereas no cracks were observed even after 160 cycles for Ex.1.

Example 4

Resistance to Long Life Coolant (LLC) and Spiral Flow

The samples were placed in an LLC containing 50 wt % of water and 50 wt % of ethylene glycol for 500 hours and 1000 hours at 130° C. TS to break was measured according to ISO 527.

Spiral flow is an accurate indicator determining the flow properties of a thermoplastic resin. Such melt flow properties for injection molding were tested by using a spiral mold based on the distance it flowed along a spiral runner of constant cross section, under controlled conditions of pressure and temperature (290° C. at nozzle and 80° C. at mold).

The results were reported in Table 2 below.

TABLE 2

|  | Ex. 1 | Comp. Ex. 1 | Comp. Ex. 2 |
|---|---|---|---|
| Spiral flow | 44.7 cm | 42.6 cm | 44.3 cm |
| TS to break (initial) | 175.0 MPa | 175.7 MPa | 184.3 MPa |
| TS to break (after 500 hours) | 101.6 MPa | 102.1 MPa | 95.6 MPa |
| TS to break (after 1000 hours) | 84.3 MPa | 81.5 MPa | 78.6 MPa |
| Retention (after 500 hours) | 58.1% | 58.1% | 51.8% |
| Retention (after 1000 hours) | 48.2% | 46.4% | 42.6% |

It should be noted that Ex. 1 of the present invention exhibited better spiral flow than Comp. Ex.1 and Comp. Ex.2, and both Ex.1 and Comp. Ex.1 showed high retention of TS to break after 500 hours (58.1%) compared to Comp. Ex.2. It should also be noted that Ex. 1 of the present invention showed the highest retention of TS to break after 1000 hours (48.2%) compared to both Comp. Ex.1 and Comp. Ex.2

Example 5

Mechanical Properties

The unnotched Charpy impact strength was measured in accordance with the standard ISO 179.

98.7 KJ/m² was obtained for Ex.1, 97.8 KJ/m² for Comp. Ex.1, and 95.4 KJ/m² for Comp. Ex.2. In addition, other properties of elongation at break and tensile modulus (Young's modulus) were equivalent for the different formulations.

The above experimental results show that the polyamide composition according to the present invention, which comprises at least one reinforcing filler and at least one ionic lubricant as well as a polyamide mixture comprising polyamide 6,6 with high AEG and a blend of high chain-length polyamides (polyamides 6,10 in the Examples) having different melt viscosity, can exhibit better salt crack resistance, while maintaining advantageous mechanical and thermal properties thereof at a time, compared to those properties of the comparative compositions which do not comprise a high chain-length polyamide having low melt viscosity and thus negative effect to flowability by the presence of an ionic lubricant cannot be compromised.

The invention claimed is:
1. A polyamide composition comprising:
(a) at least one polyamide mixture formed from
  (i) a polyamide 6,6, of which the amount of amine end groups is greater than the amount of carboxylic acid end groups; and
  (ii) a blend of a first high chain-length polyamide having a viscosity number of $X_1$ and a second high chain-length polyamide having viscosity number of $X_2$;
(b) at least one reinforcing filler;
(c) at least one heat stabilizer; and
(d) at least one ionic lubricant,
wherein
the first high-chain length polyamide and the second high chain-length polyamide have the same monomer constituents,
$X_1$ is greater than $X_2$, and viscosity number is measured in accordance with the standard ISO 307 in a 0.005 g/mL strength solution of polyamide at 25° C., and
wherein a high chain-length polyamide is a polyamide comprising recurring units ($R_{PAL}$), at least 50% moles of said recurring units ($R_{PAL}$) complying with any of formula (I) or formula (II):

$$—NH—R^1—CO— \quad \text{formula (I):}$$

$$—NH—R^2—NH—CO—R^3—CO—, \quad \text{formula (II)}$$

wherein
—R¹, equal to or different from each other at each occurrence, is a divalent hydrocarbon group having from 6 to 17 atoms and wherein $R^2$ and $R^3$, equal to or different from each other at each occurrence, are divalent hydrocarbon groups, with the proviso that at least one of following conditions is satisfied:
—$R^2$ has from 7 to 18 carbon atoms; and
—$R^3$ has from 5 to 16 carbon atoms,
or
wherein a high chain-length polyamide is a polyamide comprising recurring units ($R_{PAL}$) of the polyamide which are obtained through polycondensation reaction of one of pimelic acid [HOOC—$(CH_2)_5$—COOH], suberic acid [HOOC—$(CH_2)_6$—COOH], azelaic acid [HOOC—$(CH_2)_7$—COOH], sebacic acid [HOOC—$(CH_2)_8$—COOH], undecanedioic acid [HOOC—$(CH_2)_9$—COOH], dodecandioic acid [HOOC—$(CH_2)_{10}$—COOH], tetradecandioic acid [HOOC—$(CH_2)_{12}$—COOH], octadecandioic acid [HOOC—$(CH_2)_{16}$—COOH] with one of 1,6-diaminohexane, 1,6-diamino-2,5-dimethylhexane, 1,6-diamino-2,4-dimethylhexane, 1,6-diamino-3,3-dimethylhexane, 1,6-diamino-2,2-dimethylhexane, 1,6- diamino-2,2,4-trimethylhexane, 1,6-diamino-2,4,4-trimethylhexane, and 1,6-diamino-2,4-diethylhexane.

2. The polyamide composition according to claim 1, wherein the amount of amine end groups of the polyamide composition is at least 60 meq/kg, and viscosity number of the polyamide composition is between 110 and 140 ml/g.

3. The polyamide composition according to claim 1, wherein the amount of amine end groups of the polyamide 6,6 is greater than or equal to 50 meq/kg and the difference between the amount of amine end groups and the amount of carboxylic acid end groups in the polyamide 6,6 is greater than or equal to 5 meq/kg.

4. The polyamide composition according to claim 1, wherein said first high chain-length polyamide and said second high chain-length polyamide are independently selected from the group consisting of polyamide 11, polyamide 12, polyamide 6,10, polyamide 6,12, polyamide 6,18, polyamide 10,10, polyamide 10,12, polyamide 12,12, and mixtures thereof.

5. The polyamide composition according to claim 1, wherein $X_1$ is between 122 and 160 ml/g and $X_2$ is between 95 and 120 ml/g.

6. The polyamide composition according to claim 1, wherein an amount of the at least one polyamide mixture is from 40.0 to 95.0 wt % relative to the total weight of the polyamide composition.

7. The polyamide composition according to claim 1, wherein the weight ratio of the polyamide 6,6 to the blend of high chain-length polyamides within the polyamide mixture is between about 5:5 and about 3:7, and/or wherein the weight ratio of said first high chain-length polyamide to said second high chain-length polyamide is between about 5:2 and about 3:1.

8. The polyamide composition according to claim 1, wherein the at least one reinforcing filler is selected from the group consisting of glass fibers, glass beads, calcium carbonate, silicates, talc, kaolin, mica, wood powders, and powders and fibers of other natural products, and synthetic fibers.

9. The polyamide composition according to claim 1, wherein an amount of the at least one reinforcing filler is from 1.0 to 60.0 wt %, relative to the total weight of the polyamide composition.

10. The polyamide composition according to claim 1, wherein the at least one heat stabilizer is formed from CuI/KI in a molar ratio of CuI to KI of about 1:5.

11. The polyamide composition according to claim 1, wherein the at least one heat stabilizer is a combination of a hindered phenol compound and a phosphorous compound.

12. The polyamide composition according to claim 1, wherein the amount of the at least one heat stabilizer is from 0.05 to 3.0 wt %, relative to the total weight of the polyamide composition.

13. The polyamide composition according to claim 1, wherein the at least one ionic lubricant is selected from the group consisting of aluminum salts, alkali metal salts, alkaline earth metal salts, or esters or amides of fatty acids having 10 to 44 carbon atoms.

14. The polyamide composition according to claim 1, wherein the amount of the at least one ionic lubricant is from 0.05 to 1.0 wt %, relative to the total weight of the polyamide composition.

15. The polyamide composition according to claim 1, further comprising one or more additive selected from the group consisting of antioxidant, UV stabilizer, colorant, dye, chain extender, plasticizer, and any combinations thereof.

16. A method for producing an article exhibiting enhanced chemical resistance, comprising molding a polyamide composition to form the article, wherein the polyamide composition comprises:
(a) at least one polyamide mixture formed from
  (i) a polyamide 6,6, of which the amount of amine end groups is greater than the amount of carboxylic acid end groups; and
  (ii) a blend of a first high chain-length polyamide having a viscosity number of $X_1$ and a second high chain-length polyamide having viscosity number of $X_2$;
(b) at least one reinforcing filler;
(c) at least one heat stabilizer; and
(d) at least one ionic lubricant,
wherein
the first high-chain length polyamide and the second high chain-length polyamide have the same monomer constituents,
$X_1$ is greater than $X_2$, and viscosity number is measured in accordance with the standard ISO 307 in a 0.005 g/mL, strength solution of polyamide at 25° C., and
wherein a high chain-length polyamide is a polyamide comprising recurring units ($R_{PAL}$), at least 50% moles of said recurring units ($R_{PAL}$) complying with any of formula (I) or formula (II):

—NH—$R^1$—CO—      formula (I):

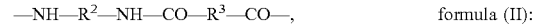
—NH—$R^2$—NH—CO—$R^3$—CO—,      formula (II):

wherein
—$R^1$, equal to or different from each other at each occurrence, is a divalent hydrocarbon group having from 6 to 17 atoms
and wherein $R^2$ and $R^3$, equal to or different from each other at each occurrence, are divalent hydrocarbon groups, with the proviso that at least one of the following conditions is satisfied:
—$R^2$ has from 7 to 18 carbon atoms; and
—$R^3$ has from 5 to 16 carbon atoms,
or
wherein a high chain-length polyamide is a polyamide comprising recurring units ($R_{PAL}$) of the polyamide which are obtained through polycondensation reaction of one of
pimelic acid [HOOC—$(CH_2)_5$—COOH], suberic acid [HOOC—$(CH_2)_6$—COOH], azelaic acid [HOOC—

(CH$_2$)$_7$—COOH], sebacic acid [HOOC—(CH$_2$)$_8$—COOH], undecanedioic acid [HOOC—(CH$_2$)$_9$—COOH], dodecandioic acid [HOOC—(CH$_2$)$_{10}$—COOH], tetradecandioic acid [HOOC—(CH$_2$)$_{12}$—COOH], octadecandioic acid [HOOC—(CH$_2$)$_{16}$—COOH] with one of 1,6-diaminohexane, 1,6-diamino-2,5-dimethylhexane, 1,6-diamino-2,4-dimethylhexane, 1,6-diamino-3,3-dimethylhexane, 1,6-diamino-2,2-dimethylhexane, 1,6- diamino-2,2,4-trimethylhexane, 1,6-diamino-2,4,4-trimethylhexane, and 1,6-diamino-2,4-diethylhexane.

17. An article, comprising a polyamide composition, wherein the polyamide composition comprises:
   (a) at least one polyamide mixture formed from
      (i) a polyamide 6,6, of which the amount of amine end groups is greater than the amount of carboxylic acid end groups: and
      (ii) a blend of a first high chain-length polyamide having a viscosity number of $X_1$ and a second high chain-length polyamide having viscosity number of $X_2$;
   (b) at least one reinforcing filler;
   (c) at least one heat stabilizer; and
   (d) at least one ionic lubricant,
   wherein
   the first high-chain length polyamide and the second high chain-length polyamide have the same monomer constituents,
   $X_1$ is greater than $X_2$, and viscosity number is measured in accordance with the standard ISO 307 in a 0.005 g/mL strength solution of polyamide at 25° C., and
   wherein a high chain-length polyamide is a polyamide comprising recurring units ($R_{PAL}$), at least 50% moles of said recurring units (Rpm) complying with any of formula (I) or formula (II):

   —NH—R$^1$—CO—  formula (I):

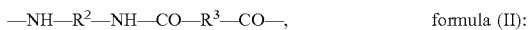
   —NH—R$^2$—NH—CO—R$^3$—CO—,  formula (II):

wherein
   —R$^1$, equal to or different from each other at each occurrence, is a divalent hydrocarbon group having from 6 to 17 atoms
   and wherein R$^2$ and R$^3$, equal to or different from each other at each occurrence, are divalent hydrocarbon groups, with the proviso that at least one of following conditions is satisfied:
   —R$^2$ has from 7 to 18 carbon atoms; and
   —R$^3$ has from 5 to 16 carbon atoms,
   or
   wherein a high chain-length polyamide is a polyamide comprising recurring units ($R_{PAL}$) of the polyamide which are obtained through polycondensation reaction of one of
   pimelic acid [HOOC—(CH$_2$)$_5$—COOH], suberic acid [HOOC—(CH$_2$)$_6$—COOH], azelaic acid [HOOC—(CH$_2$)$_7$—COOH], sebacic acid [HOOC—(CH$_2$)$_8$—COOH], undecanedioic acid [HOOC—(CH$_2$)$_9$—COOH], dodecandioic acid [HOOC—(CH$_2$)$_{10}$—COOH], tetradecandioic acid [HOOC—(CH$_2$)$_{12}$—COOH], octadecandioic acid [HOOC—(CH$_2$)$_{16}$—COOH] with one of 1,6-diaminohexane, 1,6-diamino-2,5-dimethylhexane, 1,6-diamino-2,4-dimethylhexane, 1,6-diamino-3,3-dimethylhexane, 1,6-diamino-2,2-dimethylhexane, 1,6- diamino-2,2,4-trimethylhexane, 1,6-diamino-2,4,4-trimethylhexane, and 1,6-diamino-2,4-diethylhexane.

18. The article according to claim 17, wherein the article is radiator end tank in an automobile.

19. A method to enhance flowability of a polyamide composition comprising at least one ionic lubricant, comprising the step of adding to such polyamide composition a blend of a first high chain-length polyamide having viscosity number of $X_1$ and a second high chain-length polyamide having viscosity number of $X_2$, wherein $X_1$ is greater than $X_2$, and viscosity number is in each case measured in accordance with the standard ISO 307 in a 0.005 g/mL strength solution of the high chain length polyamide at 25° C., wherein the first high-chain length polyamide and the second high chain-length polyamide have the same monomer constituents, and wherein a high chain-length polyamide is a polyamide comprising recurring units (RPAL), at least 50% moles of said recurring units ($R_{PAL}$) complying with any of formula (I) or formula (II):

—NH—R$^1$—CO—  formula (I):

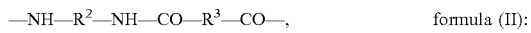
—NH—R$^2$—NH—CO—R$^3$—CO—,  formula (II):

wherein
—R$^1$, equal to or different from each other at each occurrence, is a divalent hydrocarbon group having from 6 to 17 atoms and wherein R$^2$ and R$^3$, equal to or different from each other at each occurrence, are divalent hydrocarbon groups, with the proviso that at least one of following conditions is satisfied:
—R$^2$ has from 7 to 18 carbon atoms; and
—R$^3$ has from 5 to 16 carbon atoms,
or
wherein a high chain-length polyamide is a polyamide comprising recurring units ($R_{PAL}$) of the polyamide which are obtained through polycondensation reaction of one of pimelic acid [HOOC—(CH$_2$)$_5$—COOH], suberic acid [HOOC—(CH$_2$)$_6$—COOH], azelaic acid [HOOC—(CH$_2$)$_7$—COOH], sebacic acid [HOOC—(CH$_2$)$_8$—COOH], undecanedioic acid [HOOC—(CH$_2$)$_9$—COOH], dodecandioic acid [HOOC—(CH$_2$)$_{10}$—COOH], tetradecandioic acid [HOOC—(CH$_2$)$_{12}$—COOH], octadecandioic acid [HOOC—(CH$_2$)$_{16}$—COOH] with one of 1,6-diaminohexane, 1,6-diamino-2,5-dimethylhexane, 1,6-diamino-2,4-dimethylhexane, 1,6-diamino-3,3-dimethylhexane, 1,6-diamino-2,2-dimethylhexane, 1,6- diamino-2,2,4-trimethylhexane, 1,6-diamino-2,4,4-trimethylhexane, and 1,6-diamino-2,4-diethylhexane.

20. The polyamide composition according to claim 13, wherein at least one ionic lubricant is aluminum stearate.

* * * * *